C. L. PARSONS.
PROCESS OF TREATING FULLERS' EARTH.
APPLICATION FILED AUG 29, 1906.
1,112,650.
Patented Oct. 6, 1914.
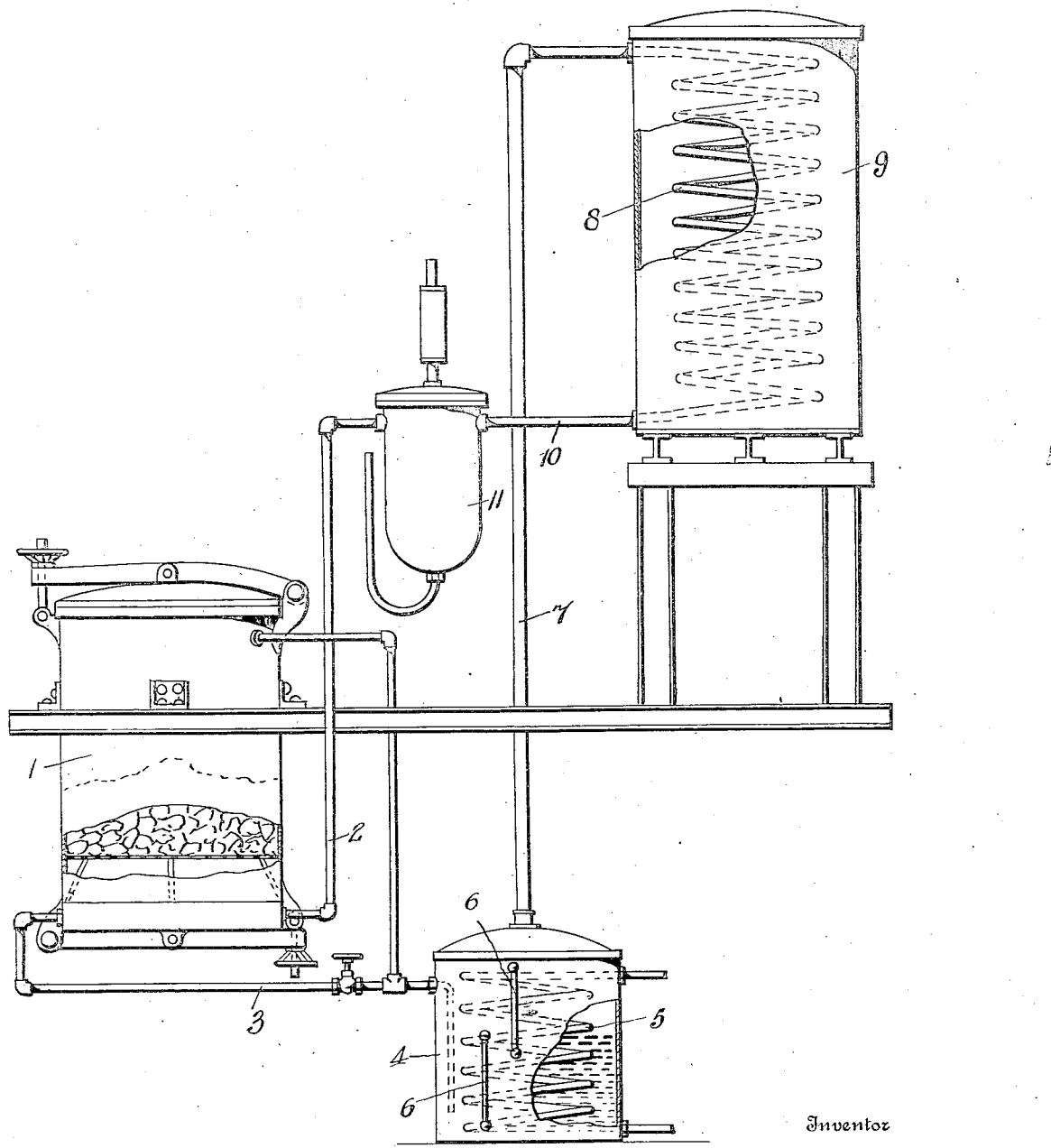
Witnesses
C. K. Davis
Myron J. Clear
Inventor
Charles L. Parsons,
By C. L. Parker
Attorney

UNITED STATES PATENT OFFICE.

CHARLES L. PARSONS, OF DURHAM, NEW HAMPSHIRE.

PROCESS OF TREATING FULLERS' EARTH.

1,112,650.   Specification of Letters Patent.   Patented Oct. 6, 1914.

Application filed August 29, 1906. Serial No. 332,528.

*To all whom it may concern:*

Be it known that I, CHARLES L. PARSONS, a citizen of the United States, residing at Durham, in the county of Strafford and State of New Hampshire, have invented certain new and useful Improvements in Processes of Treating Fullers' Earth, of which the following is a specification.

This invention relates to a process of treating fullers' earth, especially fullers' earth associated with impurities, foreign matter and the like and has particular reference to the treatment of fullers' earth which has been employed in the refining of edible or other oils.

At the present time fullers' earth which has been employed in the treatment or refining of commercial oils is a waste product, except in the case of the fullers' earth used in refining petroleum products, which is purified in some degree by burning the combustible material associated with the fullers' earth residue.

As is well known, fullers' earth comprises mineral matter in the form of a clay capable of occluding or adsorbing and holding dye stuffs. In use in refining oils it takes up impurities, notably coloring matters, therefrom, until rendered more or less inert by the inhibiting action of the selectively occluded or adsorbed oils or constituents of the oils under treatment. Prior to the discovery upon which this invention is based, no method was known of freeing such zeolitic material from the coloring matters and other impurities referred to, so that it, as well as the oil contained therein could be recovered in a condition suitable for commercial use.

Now I have discovered that, if fullers' earth residues resulting from the use of this material in refining oil be treated with a solvent of the oil, such as carbon tetrachlorid and a solvent of the coloring matter removed from the oil in the said treatment, such as ethyl alcohol or a mixture of ethyl alcohol and an acid, preferably acetic acid, fullers' earth can be recovered from the residues which is for all practical purposes identical with that originally used and further that the oil contained in the said residues can be recovered in commercially valuable form.

In the practice of my process in its preferred embodiment, I treat fullers' earth residues of the character before mentioned with carbon tetrachlorid to remove most of the oil present, free from excess of coloring matter, and follow this with a mixture of four parts by volume of carbon tetrachlorid and three fourths part by volume of ethyl alcohol and one fourth part by volume of acetic acid until the coloring matter and any remaining oil contained in the residues are eliminated therefrom. The relative amounts of the said mixture and fullers' earth residues is not important, and satisfactory results may be obtained by extracting the residues with this liquid mixture in any suitable extraction apparatus.

The liquids containing oil and coloring matters in solution are removed from the fullers' earth by leaching, centrifugal action or the use of a filter press and the carbon tetrachlorid, alcohol and acetic acid are separated from the dissolved oil, coloring matters, etc., by distillation. The remaining fullers' earth is freed from the adhering solvents by blowing steam or hot air through the mass and is dried and ground to proper size.

In the accompanying drawings, I have shown in elevation an apparatus in which my process may be advantageously carried out.

In the use of this apparatus the fullers' earth is placed in an extractor 1 and the solvent allowed to gradually percolate therethrough. The solvent may be introduced at the top, or more advantageously at the bottom through pipe 2. In either case suitable filter cloths (not shown) may be advantageously placed above or below the fullers' earth to be treated, in accordance with the usual practice in extracting. The use of the filter cloth is not necessary, however, if the solvent is introduced below the fullers' earth as the earth will separate from the solvent by gravity. After the solvent has taken up the oil or the oil and the coloring matter, it is drawn off through valve-controlled pipe 3 into a tank or boiler 4 where it is heated by steam introduced into steam coil 5. The tank or boiler 4 may be advantageously provided with gage glasses 6 as shown. Upon being heated in the tank or boiler 4 the solvent volatilizes and passes through pipe 7 into a condensing coil 8 contained in condenser 9, where the solvent is condensed. The solvent upon being condensed returns to the extracter 1 through pipes 10 and 2 between which is disposed a trap 11 of the usual construction which serves to remove any water which may be contained in the solvent. The solvent in the tank or boiler 4 is subjected to a temperature above the boiling point of such solvent and upon its evaporation, the oil or coloring matter and oil remains in the tank or boiler 4 and may be removed therefrom by a suitable outlet (not shown).

The fullers' earth may be subjected in the extractor 1 to the action of a solvent of the oil and later a solvent of the coloring matter or the fullers' earth may be subjected in the extractor A to a solvent of the oil and the coloring matter as hereinbefore indicated.

The oil resulting from the treatment of fullers' earth residues in the manner described and the recovered fullers' earth are commercial products of sufficient value to pay for their recovery.

While I have mentioned carbon tetrachlorid as the solvent of oil and ethyl alcohol or better acidified ethyl alcohol as the solvent of the coloring matter, which I prefer to employ, my invention is not restricted to the use of these two materials, as chloroform, gasolene, benzene and ether, as well as numerous other volatile compounds are also solvents of the oil and may be employed. Furthermore methyl alcohol or a mixture of methyl or ethyl alcohol or either with some acid, or their reaction products with said acid, are solvents of the coloring matters contained in fullers' earth residues and their use is contemplated as within the purview of my invention.

While I have described the preferred embodiment of my invention as comprising the treatment of the residues mentioned, first with a solvent of the oil and then with a solvent of the coloring matter, my invention is not limited thereto, as the solvents mentioned may be employed together in one operation although as stated, their use in two stages is preferred. Carbon tetrachlorid is preferably employed in the second stage because it has the property of reducing or wholly overcoming the combustibility, of the alcohol and acetic acid and thereby reducing fire risks. It may be stated in this connection that my preferred mixture which comprises four parts by volume of carbon tetrachlorid and three fourths part of alcohol and one fourth part acetic acid is non-combustible and hence its use in the second stage of my process is particularly satisfactory. If this mixture is used in the first stage of my process, the recovered oil is highly colored and not so valuable as if recovered before the main part of the contained coloring matter is extracted.

In some cases I have found that it is not necessary to employ any acid in connection with the alcohol or other solvent of the coloring matter contained in the residues in order to completely dissolve it, but in many if not most cases the coloring matter is not present in a form wholly soluble in the said solvent. By the use of an acid in connection with the solvent employed to dissolve the coloring matter the composition of the latter is modified by combining with the acid and a salt results which is freely and wholly soluble in the solvent. Acetic acid is particularly well adapted for use with the solvent for its combination with the coloring matters produces acetates which are very freely soluble in said solvent. Acetic acid is also preferred because it mixes easily with carbon tetrachlorid and alcohol and is readily volatile. Any other acid would serve to help remove the coloring matter provided the fullers' earth was treated with it previous to the removal of the coloring matter or at the same time as the treatment with alcohol.

Having thus described my invention, what I claim and desire to secure by Letters Patent, is:

1. A process of treating fullers' earth residues resulting from an oil refining process, which comprises adding to the said residues a solvent of the oil treated in the said process and a solvent of the coloring matter normally contained in said oil and separating said solvents and dissolved contents from the mass.

2. A process of treating fullers' earth residues resulting from an oil refining process which comprises adding to the said residues in a selected order of succession, a solvent of oil treated in the same process and a solvent of the coloring matter normally contained in said oil and separating the solvents and dissolved contents from the mass.

3. A process of treating fullers' earth residues resulting from an oil refining process which comprises adding to the residues a solvent of the oil treated in the said process and a solvent of the coloring matter normally contained in said oil, said first named solvent not being a solvent of the said coloring matter, and separating said solvents and dissolved contents from the mass.

4. A process of treating fullers' earth residues resulting from an oil refining process, which comprises treating the same with a solvent of the oil treated in the said process and a solvent of coloring matter normally contained in said oil, said first named solvent not being a solvent of the said coloring matter, whereby said oil and coloring matter are dissolved, removing the said solvents from the mass and separating the dissolved oil from its solvent.

5. A process of treating fullers' earth residues resulting from an oil refining process, which comprises treating the same in a selected order of succession with a solvent of the oil treated in the said process and a solvent of the coloring matter normally contained in said oil, said first named solvent not being a solvent of the said coloring matter, whereby said oil and coloring matter are dissolved, removing the said solvents and dissolved contents from the mass and separating the dissolved oil from its solvent and the dissolved coloring matter from its solvent.

6. A process of treating fullers' earth residues resulting from an oil refining process, which comprises adding to said residues a solvent of the oil treated in said process, to which solvent an acid has been added and separating said solvent and dissolved contents from the mass.

7. A process of treating fullers' earth residues resulting from an oil refining process, which comprises first treating the same with a solvent of the oil treated in said process, said solvent not being a solvent of the coloring matter normally contained in said oil, then treating the said residues with a solvent of the coloring matter normally contained in said oil and separating the said mixture and dissolved contents from the mass.

8. A process of treating fullers' earth residues resulting from an oil refining process, which comprises treating the same with carbon tetrachlorid and acidified alcohol whereby said oil and coloring matter are dissolved, removing the said materials from the mass and separating the dissolved oil and dissolved coloring matter from their respective solvents.

9. A process of treating fullers' earth residues resulting from an oil refining process, which comprises first treating the same with carbon tetrachlorid, then removing the said carbon tetrachlorid and dissolved contents, next treating the residue with acidified alcohol, then removing the said alcohol and dissolved contents and finally separating the dissolved oil and coloring matter from their respective solvents.

10. A process of treating fullers' earth residues, resulting from oil refining processes, which comprises removing the main part of the oil therefrom with a solvent of the oil, then treating the residue with a mixture containing approximately four parts by volume of carbon tetrachlorid, three fourths part by volume of alcohol and one fourth part by volume of acetic acid until the oil and coloring matter contained in the mass treated are dissolved, separating the alcohol and acid from the mass and recovering the carbon tetrachlorid and alcohol and acid from the dissolved oil and coloring matter.

11. A process of treating fullers' earth residues, resulting from oil refining processes, which comprises first removing the greater portion of the oil by means of a solvent thereof which is not a solvent of the coloring matter normally contained in the said oil, treating the residue with acidified alcohol until the coloring matter contained in the mass is dissolved, separating the alcohol and acid from the mass and recovering the said alcohol and acid from the coloring matter by distillation.

12. In the process of treating fullers' earth residues the step of removing the coloring matter contained therein by dissolving the same in a volatile solvent and an acid, the said acid being adapted to combine with the said coloring matter to form a salt soluble in said solvent, substantially as decribed.

In testimony whereof I affix my signature in presence of two witnesses.

CHARLES L. PARSONS.

Witnesses:
 CHAS. WENTWORTH,
 H. H. SMALL.